United States Patent
Wu et al.

(10) Patent No.: US 11,815,762 B2
(45) Date of Patent: Nov. 14, 2023

(54) BACKLIGHT MODULE

(71) Applicants: EPISTAR CORPORATION, Hsinchu (TW); YENRICH TECHNOLOGY CORPORATION, Hsinchu (TW)

(72) Inventors: Wen-Chien Wu, Hsinchu (TW); Wei-Shan Hu, Hsinchu (TW); Ching-Tai Cheng, Hsinchu (TW)

(73) Assignees: EPISTAR CORPORATION, Hsinchu (TW); Yenrich Technology Corporation, Hsinchu (TW)

( * ) Notice: Subject to any disclaimer, the term of this patent is extended or adjusted under 35 U.S.C. 154(b) by 0 days.

(21) Appl. No.: 18/072,264

(22) Filed: Nov. 30, 2022

(65) Prior Publication Data

US 2023/0176417 A1    Jun. 8, 2023

(30) Foreign Application Priority Data

Dec. 3, 2021 (TW) ................. 110145340

(51) Int. Cl.
*G02F 1/00* (2006.01)
*G02F 1/13357* (2006.01)

(52) U.S. Cl.
CPC .. *G02F 1/133603* (2013.01); *G02F 1/133605* (2013.01); *G02F 1/133611* (2013.01)

(58) Field of Classification Search
CPC ......... G02F 1/133603; G02F 1/133605; G02F 1/133611
See application file for complete search history.

(56) References Cited

U.S. PATENT DOCUMENTS

2011/0051411 A1* 3/2011 Kim ................. G02F 1/133603
362/235
2014/0022762 A1* 1/2014 Zheng ................. G02B 5/0278
362/97.1

(Continued)

FOREIGN PATENT DOCUMENTS

JP       2018006259 A    1/2018
KR      101168404 B1    7/2012

*Primary Examiner* — Gerald J Sufleta, II
(74) *Attorney, Agent, or Firm* — Patterson + Sheridan, LLP

(57) ABSTRACT

A backlight module is provided. The backlight module includes a substrate having a substrate surface, a conductive layer disposed on the substrate surface, a plurality of LED chips disposed on and electrically connected to the conductive layer, a light-permeable layer having a light-permeable surface away from the substrate surface, and a pattern layer disposed on the light-permeable surface and having a plurality of first patterns corresponding to and respectively located above the plurality of LED chips. Wherein, each first pattern has a maximum width. A maximum width of one first pattern satisfies the following formula:

$$W_P \geq 2n(T_E - T_L)(1 - 1/n^2)^{1/2} + W_L;$$

wherein $W_P$ is the maximum width of one first pattern, n is a refractivity of the light-permeable layer, $T_E$ is a thickness of the light-permeable layer, $T_L$ is a thickness of the LED chip, $W_L$ is a maximum width of LED chip corresponding to the first pattern.

19 Claims, 9 Drawing Sheets

(56) References Cited

U.S. PATENT DOCUMENTS

| | | | |
|---|---|---|---|
| 2015/0219936 A1* | 8/2015 | Kim | G02F 1/0105 977/950 |
| 2018/0182940 A1* | 6/2018 | Yamamoto | F21V 7/0083 |
| 2019/0011685 A1* | 1/2019 | Yeh | G02B 19/0028 |
| 2019/0293970 A1* | 9/2019 | Kim | G02F 1/133603 |
| 2020/0371397 A1* | 11/2020 | An | G02B 5/28 |
| 2021/0026203 A1* | 1/2021 | Kim | G02F 1/1339 |
| 2021/0149251 A1* | 5/2021 | Lee | G02F 1/133605 |
| 2021/0263379 A1* | 8/2021 | Lee | G02F 1/133606 |
| 2022/0137280 A1* | 5/2022 | Lai | G02B 6/0061 362/97.1 |

\* cited by examiner

BACKLIGHT MODULE

CROSS REFERENCE TO RELATED APPLICATIONS

This application claims the benefit of TW Application No. 110145340, filed on Dec. 3, 2021, and the entirety of which is incorporated by reference herein.

BACKGROUND

Technical Field

The present disclosure relates to a backlight module, and, more specifically, to a backlight module that can improve uniformity of the light output.

Description of the Related Art

Most current liquid-crystal displays (LCDs) have backlight modules that use light-emitting diode chips (LED chips) as light sources. To meet the requirements for high definition and high contrast, a direct-lit backlight module with a local dimming function is often used, so that the display can maintain its brightness in bright areas when it becomes darker in local areas.

To achieve the local dimming function, a chip-on-board (COB) configuration is introduced into the direct-lit backlight module. The backlight module usually includes a substrate having a circuit, LED chips disposed on the circuit, and a film material. The luminance uniformity of the backlight module may be influenced by the circuit layout and the arrangement of the LED chips, whereas the film material can eliminate the influence to a certain extent to increase the luminance uniformity. However, the film material may increase the thickness of the backlight module, which is not beneficial to compact products.

SUMMARY

Embodiments of the present disclosure provide a backlight module which can provide uniform light emission without greatly increasing the overall thickness when using a film material. A backlight module is provided by an embodiment of the present disclosure. The backlight module includes a substrate having a substrate surface; a conductive layer disposed on the substrate surface; a plurality of LED chips disposed on and electrically connected to the conductive layer; a light-permeable layer having a light-permeable surface away from the substrate surface; and a pattern layer disposed on the light-permeable surface and having a plurality of first patterns corresponding to and respectively located above the plurality of LED chips. Wherein, each first pattern has a maximum width, and the maximum width of one first pattern satisfies the following formula:

$$W_P \geq 2n(T_E-T_L)(1-1/n^2)^{1/2}+W_L;$$

wherein $W_P$ is the maximum width of one first pattern, n is a refractivity of the light-permeable layer, $T_E$ is a thickness of the light-permeable layer, $T_L$ is a thickness of the LED chip, $W_L$ is a maximum width of LED chip corresponding to the first pattern.

Embodiments of the present disclosure provide another backlight module. The backlight module includes a substrate having a substrate surface; a conductive layer disposed on the substrate surface; a plurality of LED chips disposed on and electrically connected to the conductive layer; a light-permeable layer disposed on the substrate surface. Wherein, the light-permeable layer has a light-permeable surface disposed away from the substrate surface; and a pattern layer disposed on the light-permeable surface, wherein the pattern layer has a plurality of first patterns and groups of second patterns, the plurality of first patterns respectively corresponding to and located above the plurality of LED chips, and one group of second patterns centers on and symmetrically surrounds one first pattern; wherein each of the plurality of first patterns has a maximum width and the maximum width of one first pattern satisfies the following formula:

$$W_P \geq W_L;\ \text{and}$$

wherein $W_P$ is the maximum width of one first pattern and $W_L$ is a maximum width of one LED chip corresponding to the first pattern.

BRIEF DESCRIPTION OF THE DRAWINGS

The accompanying drawings described herein are used to provide further understandings of the present disclosure and constituted as part of the present disclosure. The illustrative embodiments and descriptions of the present disclosure are used to explain the present disclosure, and are not constituted as inappropriate limitations to the present disclosure. In the accompanying drawings.

DETAILED DESCRIPTION OF THE DISCLOSURE

The technical solution in the embodiments of the present disclosure will be clearly and completely described below with reference to the accompanying drawings in the embodiments of the present disclosure. Apparently, the described embodiments are part of the embodiments of the present disclosure, instead of the whole embodiments. Based on the embodiments of the present disclosure, all other embodiments obtained by a person having ordinary skill in the art without a creative labour is protected within the scope of the present disclosure.

Figure 1:
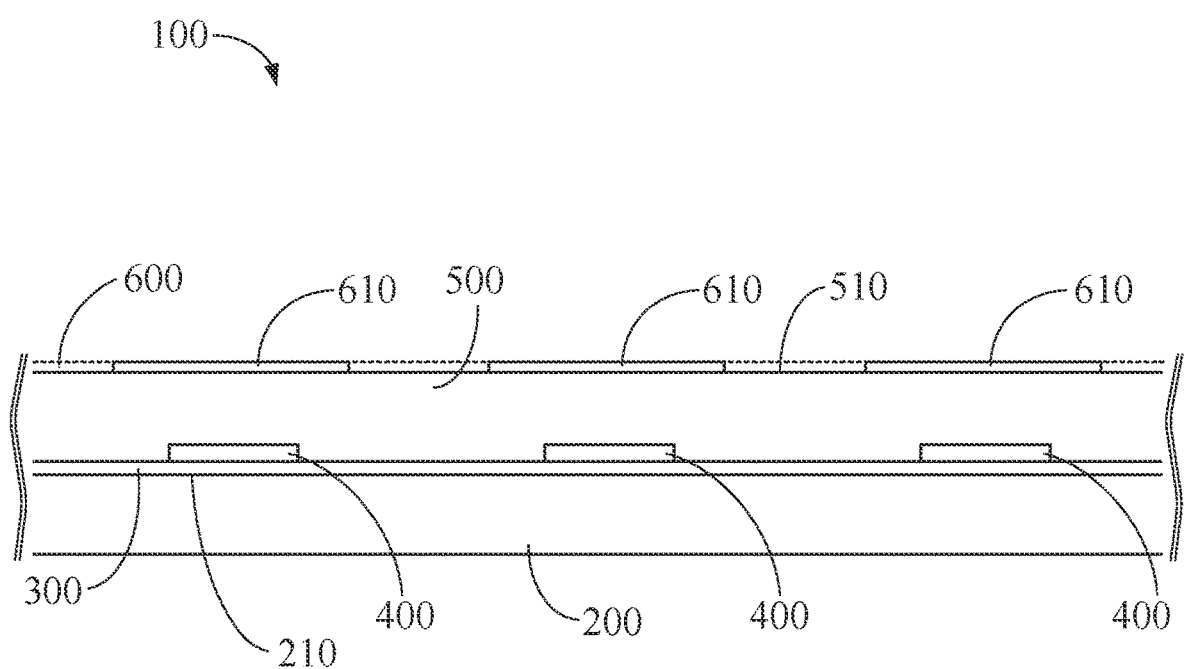
FIG. 1 is a cross-sectional view of one embodiment of a backlight module of the present disclosure.
Figure 3:
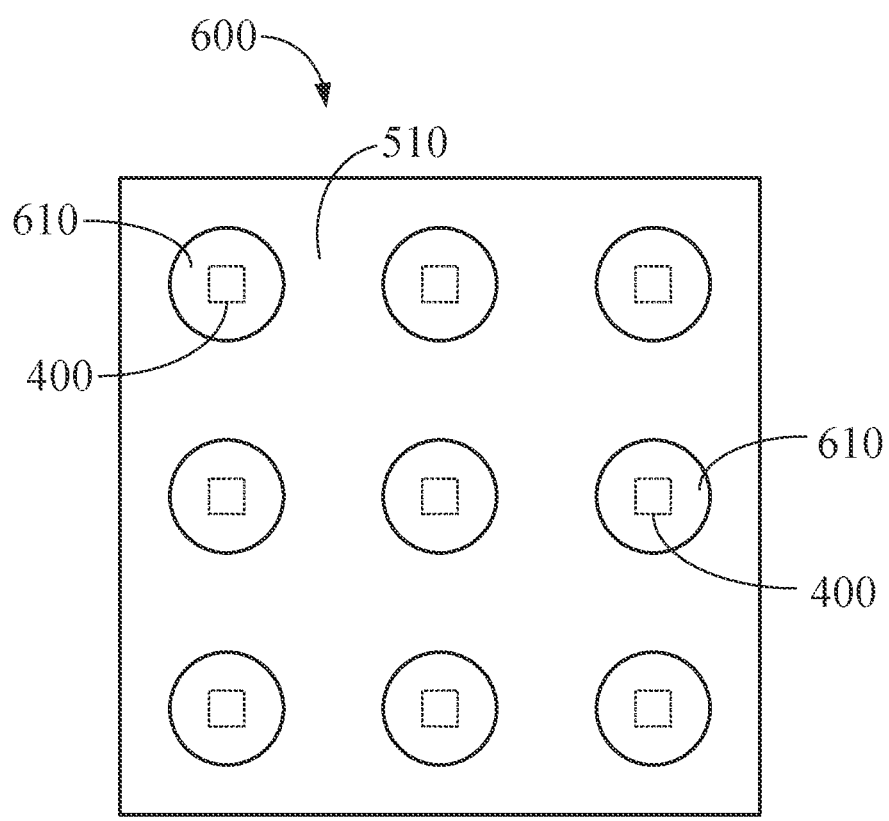
FIG. 3 is a top view of the first embodiment of a pattern layer of a backlight module of the present disclosure.

Referring to FIG. 1 in conjunction with FIG. 3, a backlight module 100 of the present disclosure includes: a substrate 200, a conductive layer 300, a plurality of LED chips 400, a light-permeable layer 500, and a pattern layer 600. The substrate 200 has a substrate surface 210. The conductive layer 300 is disposed on the substrate surface 210 of the substrate 200. The plurality of LED chips 400 are disposed on the conductive layer 300, and the plurality of LED chips 400 are electrically connected to the conductive layer 300. The light-permeable layer 500 is disposed on the substrate surface 210 of the substrate 200 and covering the substrate surface 210 of the substrate 200, the conductive layer 300, and the plurality of LED chips 400. The light-permeable layer 500 has a light-permeable surface 510, wherein the light-permeable surface 510 of the light-permeable layer 500 is disposed away from the substrate surface 210 of the substrate 200. In other words, the substrate surface 210 and the light-permeable surface 510 are respectively located on the opposite sides of the plurality of LED chips 400. A pattern layer 600 is disposed on the light-permeable surface 510 of the light-permeable layer 500 or is partially/completely embedded in the light-permeable layer 500 (not shown). As shown in FIG. 1, the pattern layer 600 has a plurality of first patterns 610, wherein the plurality of first patterns 610 is respectively located over the plurality of LED chips 400, and the plurality of first patterns 610 and the plurality of LED chips 400 are corresponding to each other at the location in the horizontal direction. More specifically, in an embodiment, one first pattern 610 is disposed directly above one LED chip 400, and the maximum width of the LED chip 400 is smaller than the maximum width of the first pattern 610 disposed directly above the LED chip 400. In the cross-sectional view as shown in FIG. 1 and/or the top view as shown in FIG. 3, the plurality of LED chips 400 and the plurality of first patterns 610 have similar or the same overall distribution pattern, and the spacing between two adjacent LED chips 400 (distance between corresponding side surfaces of two adjacent LED chips) is also similar to or the same as the spacing between two adjacent first patterns 610.

More specifically, since the emitting direction of the light having the strongest intensity is located directly above the top surfaces of the LED chips 400, to achieve a uniform light emission, a first pattern 610 is disposed at the position corresponding with the strongest light output of the LED chip 400 to shield the light. The first pattern 610 may have partial transmittance according to the requirements of the uniformity of the light output and intensity. The first patterns 610 may fully or partially reflect light from the LED chips 400. If the light of the LED chips 400 is mostly reflected (for example, the reflectivity of the first pattern 610 is greater than 95%), the light of the LED chips 400 can hardly pass through the first pattern 610 and the light intensity directly above the first pattern 610 is greatly reduced. On the contrary, if the light of the LED chips 400 is partially reflected (for example, the reflectivity of the first pattern 610 is less than or equal to 95%), part of the light of the LED chips 400 passes through the first patterns 610 to maintain a certain light intensity directly above the first patterns 610. By properly selecting the reflectivity of the first pattern 610 corresponding to the light emitted from the LED chips 400, e.g., equal to or larger than 85%, a uniform light output intensity distribution over the whole light-permeable surface 510 of the light-permeable layer 500 can be achieved. In other words, the light emitted through a region of the light-permeable surface 510 covered by the first pattern 610 and the light emitted through another region of the light-permeable surface 510 not covered by the first pattern 610 have similar light output intensities. For example, the difference between the light output intensities of the two regions is less than or equal to 30%.

Figure 2:
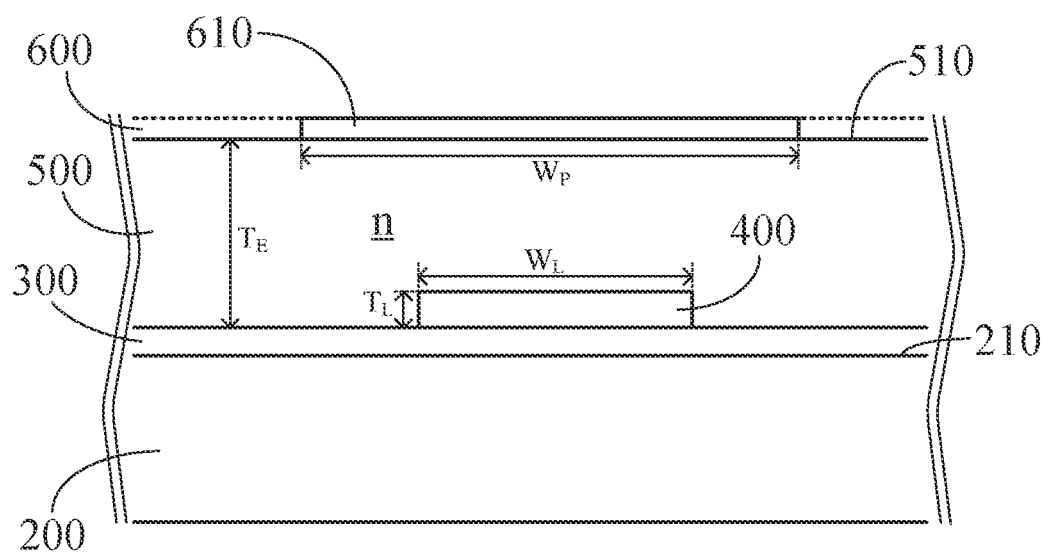
FIG. 2 is a partial cross-sectional view of one embodiment of a backlight module of the present disclosure.

FIG. 2 is a partial cross-sectional view of the backlight module 100 of the present disclosure. As shown in FIG. 2, the light-permeable surface 510 of the light-permeable layer 500 is parallel to the substrate surface 210 of the substrate 200. The first pattern 610 has a maximum width $W_P$, and the LED chip 400 is disposed on the conductive layer 300 and has a maximum width $W_L$ that satisfies the following formula:

$$W_P \geq 2n(T_E-T_L)(1-1/n^2)^{1/2}+W_L$$

wherein $W_P$ is the maximum width of the first pattern 610, n is a refractivity of the light-permeable layer 500, $T_E$ is the thickness of the light-permeable layer 500, $T_L$ is the thickness of the LED chip 400, and $W_L$ is the maximum width of the LED chip 400.

More specifically, through the arrangement of the elements in the backlight module 100 of the present disclosure, most of the light emitted from the LED chip 400 is reflected by the first pattern 610 after upwardly reaching the first pattern 610, so that the emitted light travels inside the light-permeable layer 500 and is emitted out through the light-permeable surface 510 that is not covered by the first pattern 610.

In addition to being blocked and/or reflected by the first pattern 610, the light emitted from the LED chip 400 to the outermost periphery (maximum width $W_P$) of the first pattern 610 travels along the light-permeable surface 510 of the light-permeable layer 500 (i.e., this part of the light is not reflected or refracted to the pattern layer 600 above the light-permeable surface) because the incident angle of the light is equal to the critical angle. On the other hand, another part of the light emitted from the LED chip 400 to the region beyond the outermost periphery (the region greater than the maximum width $W_P$) of pattern 610 travels restrictively inside the light-permeable layer 500 due to total reflection caused by the incident angle of the light greater than the critical angle. Such light is at last emitted out through a region of the light-permeable surface 510 not covered by the first patterns 610 after repeated internal reflections.

As a result, in addition to the aforementioned two parts, in the backlight module 100 of the present disclosure, since the main light-emitting direction of the LED chip 400 is directly above the LED chip 400, most of the light emitted from the LED chip 400 is reflected by the first pattern 610 disposed above the LED chip 400, whereas the rest of the light emitted from the LED chip 400 travels along the light-permeable surface 510 of the light-permeable layer 500, or travels inside the light-permeable layer 500 due to total reflection because the incident angle of the light is greater than the critical angle. Therefore, due to the arrangement of the first pattern 610, the traveling route of the light emitted from the LED chip 400 cannot be emitted out through the light-permeable layer 500 in the shortest path, and needs to be reflected multiple times inside the light-permeable layer 500 before being emitting out through other regions that are not covered by the first patterns 610, thereby achieving a uniform light emission of the backlight module 100 of the present disclosure.

FIG. 3 shows a top view of the pattern layer 600 disclosed in the first embodiment of the present disclosure. In the first embodiment, the pattern layer 600 has a plurality of first patterns 610 disposed on the light-permeable surface 510 of the light-permeable layer 500. In other words, part of the light-permeable surface 510 of the light-permeable layer 500 not covered by the plurality of first patterns 610 can be seen directly. The plurality of first patterns 610 is arranged as an array, and the spacing between two adjacent first patterns 610 is the same and fixed in the vertical and horizontal directions. Besides, a single first pattern 610 completely covers and corresponds to a single LED chip 400. In other embodiments, the spacing between the two adjacent first patterns 610 in the vertical and horizontal directions may not be the same, or the spacing between the two adjacent first patterns 610 is not fixed. For example, the spacing can become larger or smaller in a specific direction or vary irregularly, or a single first pattern 610 may completely or partially cover and correspond to multiple LED chips 400.

In FIG. 3, the first pattern 610 in the pattern layer 600 is illustrated as a circle, but the present disclosure is not limited thereto. The first pattern 610 in FIG. 3 may also be formed as an ellipse, triangle, quadrilateral or other polygon.

Figure 4:
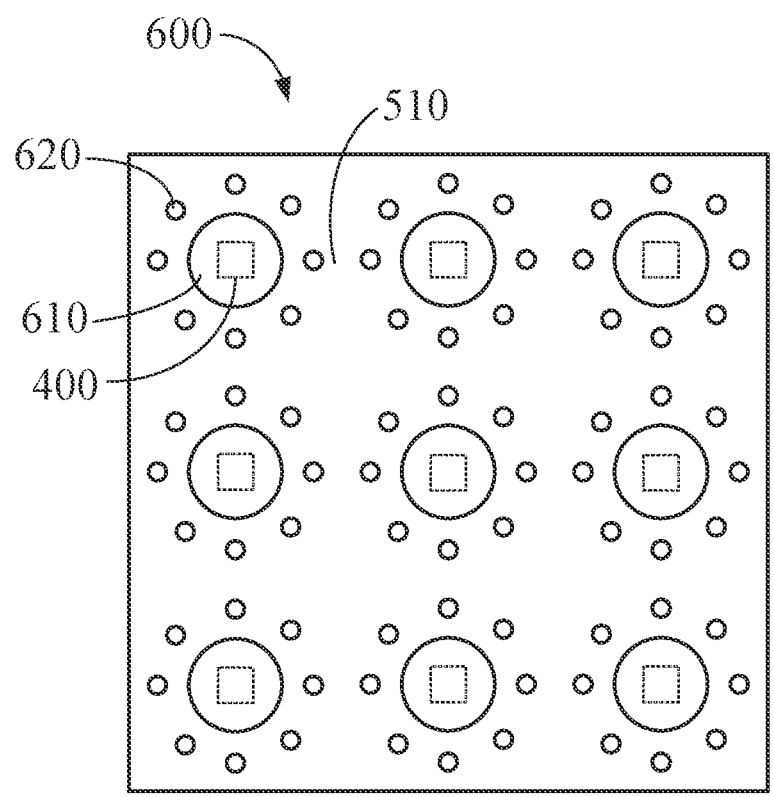
FIG. 4 is a top view of the second embodiment of a pattern layer of a backlight module of the present disclosure.

FIG. 4 shows a top view of the pattern layer 600 disclosed in the second embodiment of the present disclosure. In the second embodiment, the pattern layer 600 further include groups of second patterns 620, and each group of second patterns 620 surrounds each first pattern 610 symmetrically.

In the embodiment shown in FIG. 4, each of the first patterns 610 is surrounded by eight second patterns 620, wherein the eight second patterns 620 form a group in mirror symmetry to a vertical line or a horizontal line passing through the symmetric center of each first pattern 610, and the area of each first pattern 610 on the light-permeable surface 510 is greater than the total area of all the eight surrounding second patterns 620. That is, the area of each first pattern 610 in the second embodiment is greater than the total area of the surrounding group of the second patterns 620. Most of the light with smaller angle emitted from the LED chips 400 can be reflected by the first pattern 610, and the second pattern 620 may further increase the reflection quantity of the light in the light-permeable layer 500 to achieve a uniform light output.

In some embodiments, the area of the light-permeable surface 510 of the light-permeable layer 500 not covered by the plurality of first patterns 610 and the groups of second patterns 620 is greater than the area covered by the plurality of first patterns 610 and the groups of second patterns 620. Therefore, although part of the light emitted from the LED chips 400 may be blocked and/or reflected by the first patterns and the second patterns 620 when the light is reflected multiple times and emitted out through the light-permeable surface 510 of the light-permeable layer 500, because the area of the light-permeable surface 510 of the light-permeable layer 500 not covered by the plurality of first patterns 610 and the groups of second patterns 620 is greater than the area covered by the plurality of first patterns 610 and the groups of second patterns 620, the overall light emitted from the light-permeable surface 510 of the light-permeable layer 500 may still maintain a certain brightness and uniformity.

In FIG. 4, the first pattern 610 and the second pattern 620 in the pattern layer 600 are illustrated as circles, but the present disclosure is not limited thereto. The first pattern 610 and the second pattern 620 illustrated in FIG. 4 may also be formed as ellipses, triangles, quadrilaterals or other polygons.

Figure 5:
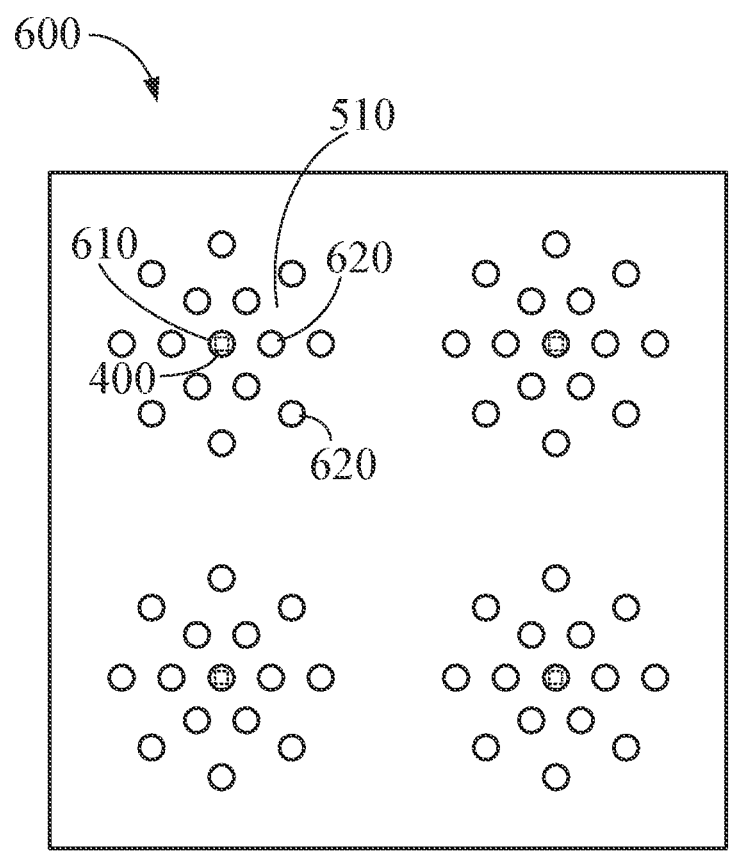
FIG. 5 is a top view of the third embodiment of a pattern layer of a backlight module of the present disclosure.

FIG. 5 shows a top view of the pattern layer 600 disclosed in the third embodiment of the present disclosure. In the third embodiment, the maximum width $W_P$ of the first pattern 610 disposed above the plurality of LED chips 400 is not the same as the aforementioned design rule in the first and second embodiments. That is, the required area or size of one first pattern 610 is to be capable of covering one LED chip 400 in the projection direction or in the top view as shown in FIG. 5. Therefore, the maximum width $W_P$ of the first pattern 610 and the maximum width $W_L$ of the LED chip 400 satisfy the following formula: $W_P \geq W_L$.

Besides, in the third embodiment of the pattern layer 600 shown in FIG. 5, the area of a single first pattern 610 is equal to the area of a single second pattern 620. In other words, one first pattern 610 and one second pattern 620 respectively cover the same area of the light-permeable surface 510 of the light-permeable layer 500. One first pattern 610 is surrounded by one group of the second patterns 620 arranged denser than that in the second embodiment. More specifically, one group of the second patterns 620 is arranged in mirror symmetry to a vertical line or a horizontal line passing through a symmetric center of one first pattern 610 (not shown). As shown in FIG. 5, each first patterns 610 is surrounded by two sub-groups of second patterns 620, and each second pattern in the same sub-group in this embodiment is equally distant from the symmetric center of the corresponding first pattern 610. Taking the first pattern 610 at the upper-left corner as an example, the amount of the first sub-group of second patterns 620 near the first pattern 610 is six, whereas the amount of the second sub-group of second patterns 620 far from the first pattern 610 is eight. In other words, in the third embodiment, each first pattern 610 can be surrounded by fourteen second patterns 620. Therefore, when most of the light emitted from the LED chips 400 is reflected by the first pattern 610 at the first time, the surrounding fourteen second patterns 620 can further increase the reflection quantity of the light which is reflected by the first pattern 610 in the light-permeable layer 500 to further reduce the intensity of the light close to the LED chips 400. Consequently, the light reflected by the first patterns 610 is reflected multiple times and then emitted out through the light-permeable surface 510 of the light-permeable layer 500 to achieve a uniform light output.

In FIG. 5, the first pattern 610 and the second pattern 620 in the pattern layer 600 are illustrated as circles, but the present disclosure is not limited thereto. The first pattern 610 and second pattern 620 illustrated in FIG. 5 may also be formed as ellipses, triangles, quadrilaterals or other polygons.

Figure 6:
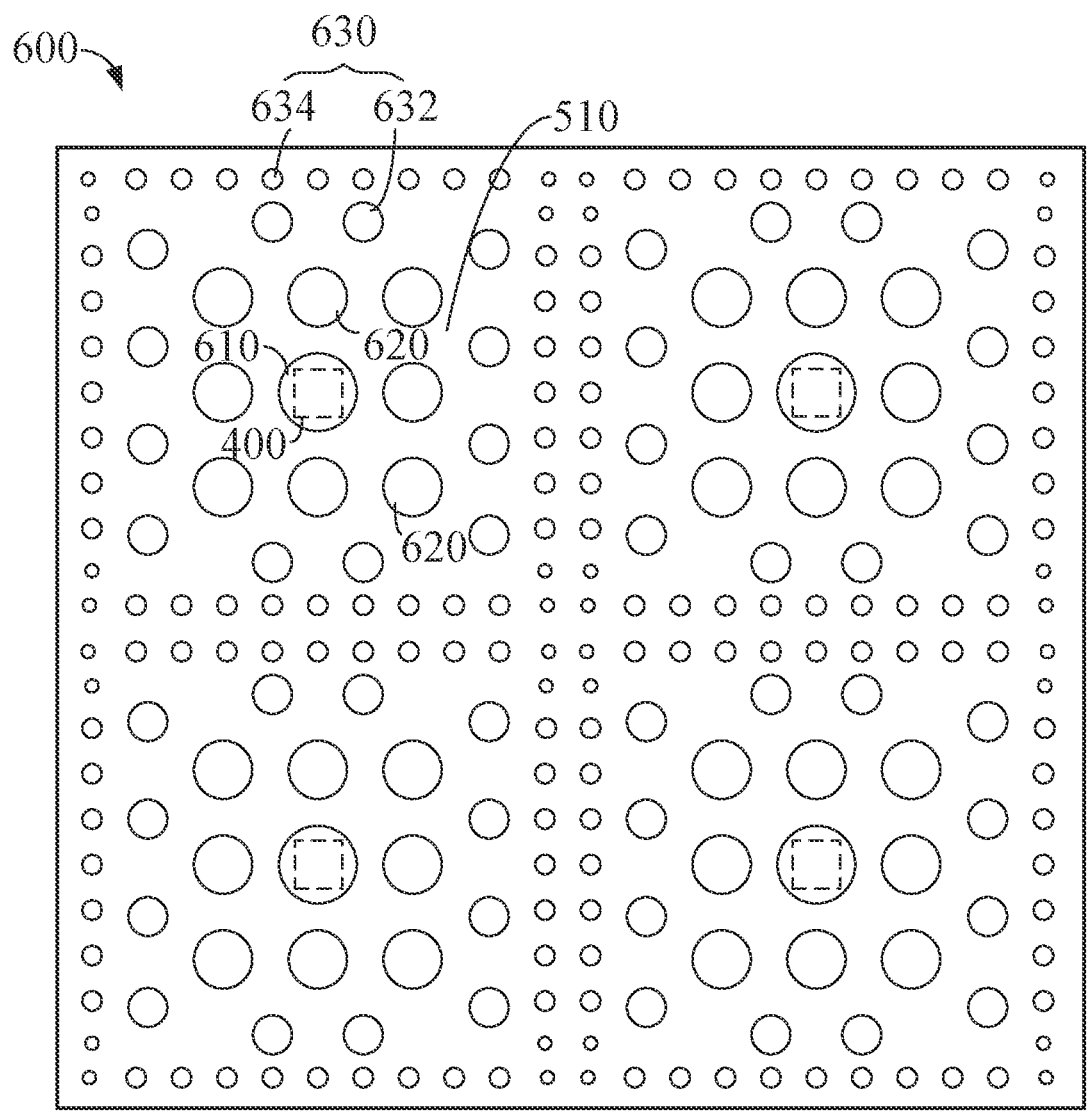
FIG. 6 is a top view of the fourth embodiment of a pattern layer of a backlight module of the present disclosure.

FIG. 6 shows a top view of the pattern layer 600 disclosed in the fourth embodiment of the present disclosure. In the fourth embodiment, in addition to having a plurality of first patterns 610 and groups of second patterns 620, the pattern layer 600 may also include groups of third patterns 630, wherein each group of third patterns 630 surrounds a single first pattern 610 and the outer periphery of the corresponding group of second patterns 620.

More specifically, as shown in FIG. 6, a single group of third patterns 630 further includes a plurality of main patterns 632 and a plurality of sub-patterns 634, wherein the plurality of sub-patterns 634 surrounds the plurality of main patterns 632 with one first pattern 610 disposed at the center, and the area of one main pattern 632 is greater than the area of one sub-pattern 634. Similar to the aforementioned embodiments, the area covering the light-permeable surface 510 by the combination of each first pattern 610 and corresponding eight second patterns 620 is greater than the total area covering the light-permeable surface 510 by the combination of corresponding twelve main patterns 632, and the area covering the light-permeable surface 510 by the combination of each corresponding twelve main patterns 632 is greater than the total area covering the light-permeable surface 510 by the combination of each corresponding forty sub-patterns 634. In an embodiment, the first pattern 610, second patterns 620, main patterns 632 of the third pattern 630, and sub-patterns 634 of the third pattern 630 are arranged outwardly with the first pattern 610 as a center, and the patterned (shielding) area decreases outwardly from the center, but the density of patterns increase outwardly from the center. As a result, when most of the light emitted from the LED chips 400 is blocked and/or reflected by the first pattern 610 at the center, the surrounding eight second patterns 620, twelve main patterns 632, and forty sub-patterns 634 can increase the reflection quantity of the light which is reflected by the first pattern 610 in the light-permeable layer 500, so that the light reflected by the first patterns 610 is reflected multiple times and then emitted out through the light-permeable surface 510 of the light-permeable layer 500 to achieve a uniform light output.

In the backlight module 100 of the present disclosure, the pattern layer 600 has a thickness between 15 μm and 35 μm. The thickness of each pattern in the pattern layer 600 may be the same or different. Besides, the pattern layer 600 is disposed on the light-permeable surface 510 of the light-permeable layer 500 by printing or dispensing, and the material of the pattern layer 600 may be silicon resin, but is not limited thereto.

In FIG. 6, the first pattern 610, second pattern 620, and third pattern 630 in pattern layer 600 are illustrated as circles, but the present disclosure is not limited thereto. The first pattern 610, second pattern 620, and third pattern 620 illustrated in FIG. 6 may also be formed as ellipses, triangles, quadrilaterals or other polygons.

The uniform light emission is achieved by changing the size and distribution of each pattern included in the pattern layer 600 disclosed in the first to fourth embodiments as shown in FIGS. 3 to 6. More specifically, as a whole, by adjusting the size and distribution of each pattern in the pattern layer 600, the proportion of the light-permeable surface 510 covered by various patterns gradually decreases outwardly from the symmetric center of the corresponding LED chips 400 in the top view, so that the probability of light-emitting out through the light-permeable layer 500 and/or the luminance quantity and/or the luminance intensity of the light is gradually increased outwardly from the LED chip 400, thereby achieving a uniform lighting output. In other embodiments, the reflectivity can also be changed solely or in combination with the adjustment of the thickness of the pattern layer 600.

Figure 7:
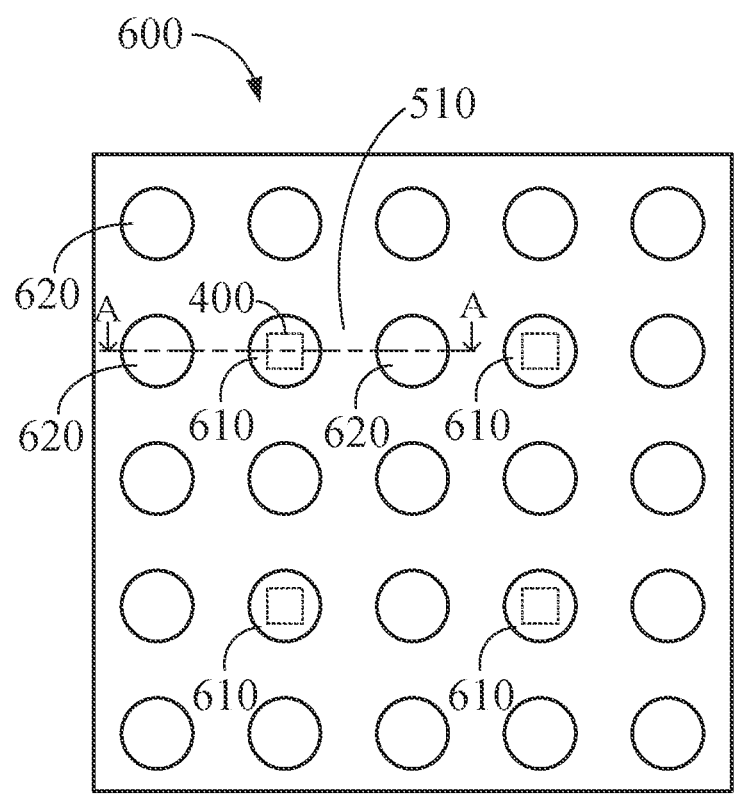
FIG. 7 is a top view of the fifth embodiment of a pattern layer of a backlight module of the present disclosure.
Figure 8:
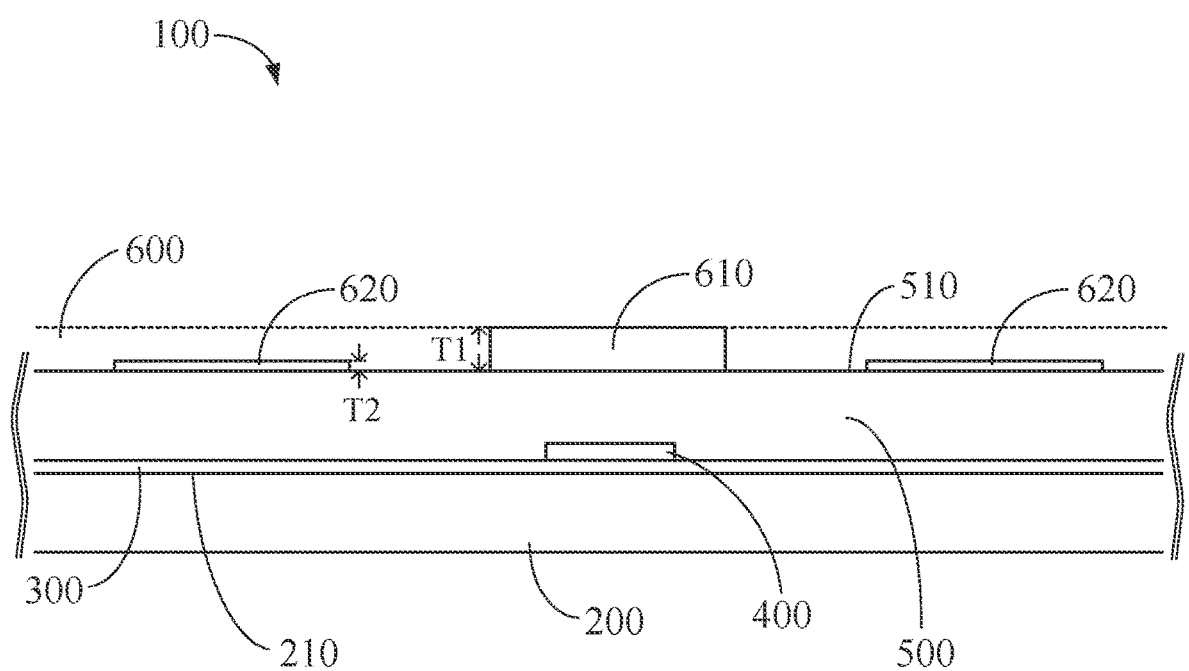
FIG. 8 is a cross-sectional view taken along line A-A of FIG. 7.

FIG. 7 shows a top view of the pattern layer 600 disclosed in the fifth embodiment of the present disclosure, and FIG. 8 is a cross-sectional view taken along line A-A of FIG. 7. As shown in FIG. 7 and FIG. 8, the pattern layer 600 has a plurality of first patterns 610 and a plurality of second patterns 620 disposed around the plurality of first patterns 610. The area of the light-permeable surface 510 of the light-permeable layer 500 covered by the first patterns 610 is equal to the area of the light-permeable surface 510 of the light-permeable layer 500 covered by the second patterns 620, and each first patterns 610 is disposed in a manner that corresponds to each LED chip 400, while the plurality of second patterns 620 and the plurality of first patterns 610 are alternately arranged on the light-permeable surface 510 in an equidistant manner.

As shown in FIG. 8, the first pattern 610 disposed directly above the LED chips 400 has a first thickness T1 and the second pattern 620 disposed around the first pattern 610 has a second thickness T2, wherein the first thickness T1 is greater than the second thickness T2. Because the increase of thickness may lead to the decrease of the transmittance, in the fifth embodiment, the first pattern 610 directly above the LED chip 400 has a lower transmittance and the second pattern 620 without the LED chip 400 located below has a higher transmittance. When the location directly above the LED chips 400 with the strongest light-emitting intensity (i.e., the position disposed with the first pattern 610) has the lowest transmittance and other locations with the weaker light-emitting intensity (i.e., the position disposed with the second pattern 620) have higher transmittance, a uniform light output of the LED chips 400 can also be achieved.

Those skilled in the art may also make changes according to the disclosed content of the fifth embodiment, so that the pattern layer 600 has patterns other than the first patterns 610 and the second patterns 620, and wherein the patterns other than the first patterns 610 and the second patterns 620 have corresponding thicknesses and reflectivities to further uniformizing the light output from the LED chips 400.

Figure 9:
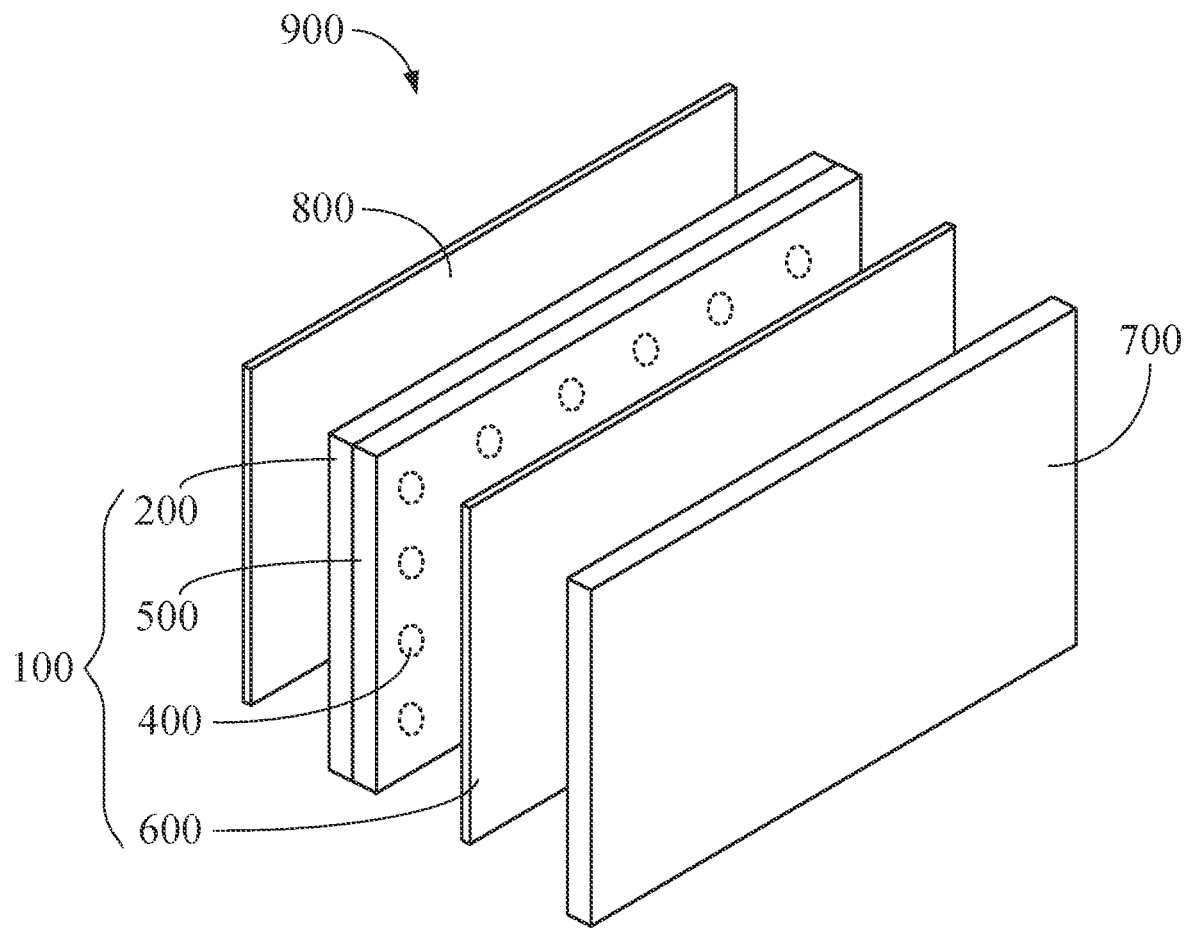
FIG. 9 is an illustrative diagram of one embodiment of the backlight module of the present disclosure applied in a display.

As shown in FIG. 9, because the backlight module 100 of the present disclosure has replaced the traditional light guide layer and diffuser plate with the pattern layer 600 with a smaller thickness, when a display 900 incorporates a display panel 700, a reflection plate 800, and the backlight module 100 including the substrate 200, the plurality of LED chips 400, the light-permeable layer 500, and the pattern layer 600 disclosed in the embodiments of the present disclosure, the display 900 has a thinner overall thickness compared to the existing design, which is beneficial for compact products in those applications.

The substrate used in the backlight module 100 of the present disclosure may be a printed circuit board (PCB), ceramic substrate, or silicon substrate; the material of the light-permeable layer 500 may be formed of an organic polymer material such as polymethylmethacrylate (PMMA), or polystyrene (PS), or may be formed of other transparent resin materials, for example, acrylic resin, cyclic olefin copolymer (COC), polycarbonate (PC), or silicone; and the material of the pattern layer 600 may be a reflective material. The material with required reflectivity may include, for example, matrix and reflective particles dispensed in the matrix. The matrix may be the resin material with transparency as mentioned above, and the material of the reflective particles may be: an oxide such as titanium oxide, zinc oxide, zirconium oxide, and aluminum oxide; a carbonate such as white lead (basic lead carbonate) or calcium carbonate; a clay mineral such as kaolinite; and so on.

In summary, in an aspect of the backlight module 100 of the present disclosure, the maximum width of the first pattern 610 in the pattern layer 600 is limited to appropriately block and/or reflect the emission light which is emitted from the LED chips 400 and toward the first pattern 610 directly above the LED chips 400, thereby increasing the reflection quantity of the light in the light-permeable layer 500 and uniformizing the brightness performance of the light emitted out through the light-permeable layer 500 to meet the high contrast requirement of a display. Besides, since the thickness of the pattern layer 600 in the embodiment of the present disclosure is between 15 μm and 35 μm, when replacing the diffuser plate having a thickness up to 1.3 mm in the existing structure with the pattern layer 600 disclosed in the embodiment of the present disclosure, the overall thickness of the backlight module can be effectively decreased and the overall cost of the module can be reduced. In another aspect of the backlight module 100 of the present disclosure, under the condition that the size and distributed density of each pattern of the pattern layer is the same, the reflectivity can be changed by adjusting the thickness of each pattern, thereby achieving a uniform light output of the LED chips 400.

The abovementioned embodiments are merely for illustrating the technical idea and features of the present disclosure, and the purpose is to enable those skilled in the art to understand the content of the present disclosure and implement it accordingly. It cannot be used to limit the patent scope of the present disclosure, that is, all equivalent changes or modifications made in accordance with the spirit disclosed in the present disclosure shall still be covered within the patent scope of the present disclosure.

What is claimed is:

1. A backlight module, comprising:
   a substrate, comprising a substrate surface;
   a conductive layer, disposed on the substrate surface;
   a plurality of light-emitting diode chips (LED chips) disposed on and electrically connected to the conductive layer;
   a light-permeable layer comprising a light-permeable surface away from the substrate surface; and
   a pattern layer disposed on the light-permeable surface and comprising a plurality of first patterns corresponding to and respectively located above the plurality of LED chips;
   wherein each first pattern has a maximum width, and the maximum width of one first pattern satisfies the following formula:

$W_P \geq 2n(T_E-T_L)(1-1/n^2)^{1/2}+W_L;$ wherein $W_P$ is the maximum width of one first pattern, n is a refractivity of the light-permeable layer, $T_E$ is a thickness of the light-permeable layer, $T_L$ is a thickness of the LED chip, and $W_L$ is a maximum width of the LED corresponding to the first patterns.

2. The backlight module of claim 1, wherein the pattern layer comprises groups of second patterns, and one group of second patterns centers on and symmetrically surrounds one of the first patterns.

3. The backlight module of claim 2, wherein an area of one of the first patterns covering the light-permeable surface is greater than an area of a corresponding one group of second patterns covering the light-permeable surface.

4. The backlight module of claim 3, wherein an area of the light-permeable surface not covered by the plurality of first patterns and the groups of second patterns is greater than an area covered by either the plurality of first patterns or the groups of second patterns.

5. The backlight module of claim 1, wherein a thickness of the pattern layer is between 15 μm and 35 μm.

6. The backlight module of claim 1, wherein the light-permeable layer further covers the substrate surface, the conductive layer, and the plurality of LED chips.

7. The backlight module of claim 1, wherein a difference of light intensities between light emitted through an area with one of the first patterns and light emitted through an area without the first pattern is less than or equal to 30%.

8. The backlight module of claim 1, wherein a reflectivity of the first pattern is equal to or larger than 85%.

9. A backlight module, comprising:
   a substrate, comprising a substrate surface;
   a conductive layer, disposed on the substrate surface;
   a plurality of light-emitting diode chips (LED chips), disposed on and electrically connected to the conductive layer;
   a light-permeable layer, disposed on the substrate surface and comprising a light-permeable surface disposed away from the substrate surface; and
   a pattern layer, disposed on the light-permeable surface, wherein the pattern layer has a plurality of first patterns and groups of second patterns, the plurality of first patterns respectively correspond to and are located above the plurality of LED chips, and one group of second patterns centers on and symmetrically surrounds one of the first patterns,
   wherein each of the plurality of first patterns has a maximum width, and the maximum width of one first pattern satisfying the following formula:

$W_P \geq W_L;$ wherein $W_P$ is the maximum width of one first pattern and $W_L$ is a maximum width of one of the LED chips corresponding to the one first pattern, and
   wherein a thickness of the pattern layer is between 15 μm and 35 μm.

10. The backlight module of claim 9, wherein an area of one of the first patterns covering the light-permeable surface is equal to an area of a corresponding one group of second patterns covering the light-permeable surface.

11. The backlight module of claim 10, wherein one of the first patterns has a first thickness, the corresponding one group of second patterns has a second thickness, and the first thickness is greater than the second thickness.

12. The backlight module of claim 9, wherein each of the plurality of first patterns is surrounded by two groups of second patterns, and each second pattern in the same group is equally distant from a symmetric center of one corresponding first pattern.

13. The backlight module of claim 12, wherein a number of the group of second patterns closer to the first pattern is fewer than that farther from the first pattern.

14. The backlight module of claim 9, wherein the pattern layer has groups of third patterns, one group of third patterns centers on one of the first patterns and surrounds an outer periphery of one group of second patterns.

15. The backlight module of claim 14, wherein an amount of one group of third patterns is more than an amount of the corresponding one group of second patterns.

16. The backlight module of claim 14, wherein one group of third patterns has a plurality of main patterns and a plurality of sub-patterns, the plurality of sub-patterns surround an outer periphery of the plurality of main patterns, and areas of the light-permeable surface covered by one of the first patterns, a corresponding one group of second patterns, a corresponding plurality of main patterns, and a corresponding plurality of sub-patterns gradually decrease toward the outer periphery with the one of the first pattern as a center.

17. The backlight module of claim 9, wherein the light-permeable layer further covers the substrate surface, the conductive layer, and the plurality of LED chips.

18. The backlight module of claim 9, wherein a difference of light intensities between light emitted through an area with one of the first patterns and light emitted through an area without a first pattern is less than or equal to 30%.

19. The backlight module of claim 9, wherein a reflectivity of the first pattern is equal to or larger than 85%.

* * * * *